May 19, 1953  F. W. WAHLIN  2,639,194
ANTIDRIP VALVE FOR SPRAY NOZZLES
Filed Dec. 21, 1950
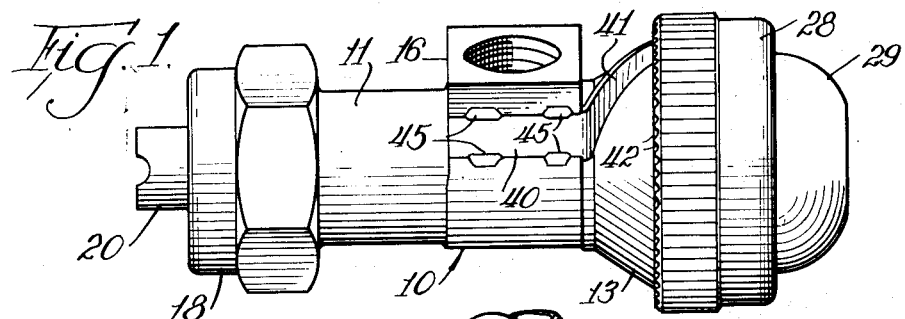
Fig. 1.
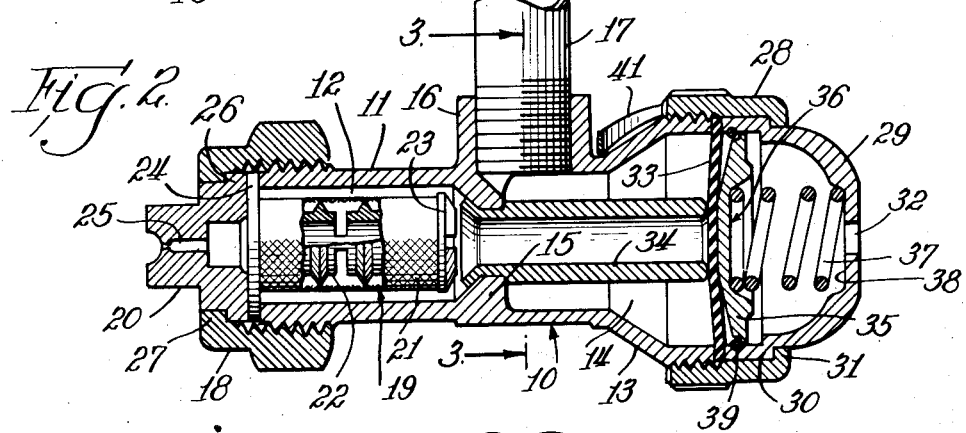
Fig. 2.
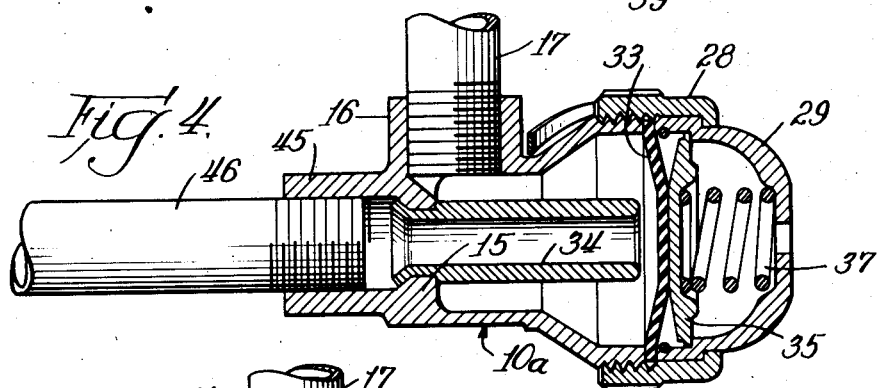
Fig. 4.
Fig. 3.
INVENTOR.
Fred W. Wahlin
BY
Eugene M Giles Atty.

Patented May 19, 1953

2,639,194

UNITED STATES PATENT OFFICE 2,639,194

ANTIDRIP VALVE FOR SPRAY NOZZLES

Fred W. Wahlin, Oak Park, Ill., assignor to Spraying Systems Co., Chicago, Ill., a corporation of Illinois Application December 21, 1950, Serial No. 201,939

3 Claims. (Cl. 299—150)

My invention relates to valves which are particularly adapted for use in connection with spray nozzles to prevent dripping therefrom when pressure is shut off, and has reference more particularly to a diaphragm valve which effectively prevents dripping under the various conditions of spray nozzle use.

Such valves must be simple, inexpensive and reliable—they must operate freely and with certainty, even after prolonged periods of seating, and without appreciably affecting the spray pressure, and it is particularly important that they perform their functions normally and properly under varying conditions of use and are not affected by sudden or precipitate movements, such for example as the banking of an airplane in which they are installed.

The principal objects of my invention are to provide an improved valve which satisfies the above mentioned requirements for use with spray nozzles and which may be conveniently incorporated in the spray nozzle assembly, if desired, these and other objects being accomplished as hereinafter described and as shown in the accompanying drawing, in which:

Fig. 1 is a side view of a nozzle having a diaphragm valve combined therewith in accordance with my invention;

Fig. 2 is a longitudinal sectional view of the nozzle and diaphragm valve assembly of Fig. 1, showing the diaphragm valve in closed position;

Fig. 3 is a cross sectional view of the nozzle and diaphragm valve assembly of Figs. 1 and 2, taken on the line 3—3 of Fig. 2; and Fig. 4 is a longitudinal sectional view, similar to that of Fig. 2, but showing the diaphragm valve as a separate unit which may be interposed in the supply line which leads to the nozzle, the diaphragm valve being shown in the open position.

In the preferred form which is illustrated in Figs. 1 and 2 the spray nozzle is at one end and the diaphragm valve at the other end of a combination spray nozzle and valve body which is indicated as a whole at 10 and has a cylindrical portion 11 at one end with a strainer chamber 12 therein and a flared portion 13 at the other end with a valve chamber 14 therein which is separated from the centrally apertured partition 15.

An internally threaded hub 16 extends laterally from the body 10 near the middle for attachment of a pipe 17 through which liquid is supplied to the spray nozzle and opens into the valve chamber 14 at the inner end thereof.

The nozzle end portion 11 of the body is externally threaded at its outer end for engagement by an internally threaded clamping ring 18 which secures the strainer assembly 19 in the strainer chamber 12 and the nozzle tip 20 to the outer end of the nozzle end portion 11 in the same manner, as such parts are secured to the nozzle body in my application Serial No. 81,288 filed March 14, 1949 now Patent No. 2,621,078.

This strainer assembly 19 comprises a cylindrical strainer 21 which is secured on a strainer support 22 by a headed screw 23 which is threaded into one end of the strainer support 22 and the strainer support has an annular flange 24 at the outer end which clamps against the outer end of the nozzle end portion 11.

The nozzle tip 20 has a central opening 25 through which the liquid is discharged in a spray and at its base this tip 20 has an annular flange 26 over which the internal flange 27 at the outer end of the clamping ring 18 engages for clamping the nozzle tip against the annular flange 24 of the strainer holder and for clamping the latter flange against the outer end of the nozzle end portion 11 to provide a sealed connection of these parts, the arrangement being such that liquid supplied to the strainer chamber 12 is forced through the strainer 21 into the interior thereof and outwardly therefrom at the outer end into the discharge passageway 25 of the nozzle tip.

The flared portion 13 at the other end of the body 10 is also externally threaded at its outer end for threaded engagement by an internally threaded clamping ring 28 by which a cap 29 is secured onto the outer end of the flared portion 13, said cap 29 having a peripheral offset 30 therearound at its base over which an internal flange 31 at the outer end of the clamping ring 28 engages for securing the cap to the outer end of the flared portion 13. Said cap also has a vent opening 32 at its outer end.

A diaphragm valve 33 is secured on the outer end of the flared portion 13 by the cap 29 and clamping ring 28, said valve having the periphery thereof clamped between the cap 29 and the outer end face of the flared portion 13, as shown in Fig. 2, and the partition 15, between the strainer chamber 12 and the valve chamber 14, has a tube 34 secured at one end in the central opening thereof in a rigid leak-proof manner and extending concentrically through the valve chamber so as to terminate at one side of the central portion of the diaphragm 33 in a position sufficiently close thereto to be readily closed by the diaphragm valve.

This diaphragm valve is a thin flat disk of flexible sheet material, such as a vulcanized synthetic rubber compound, which is impermeable to air and liquid and inert to the liquid to be sprayed and non-adherent to the material of the tube 34, and the outer end of said tube is rounded and smoothed to provide a surface against which the diaphragm 33 will seat readily in a leak-proof manner.

A light weight follower 35 is adapted to slide freely in the peripherally enlarged inner end of the cap 29 and at its outer side has a central seat 36 for the inner end of a light spring 37 the outer end of which is engaged in a central seat 38 at the outer end of said cap to cause the follower to bear against the outer side of the diaphragm 33 for seating the latter against the outer end of the tube 34. The side of the follower which bears against the diaphragm is of convex form as shown with a central flat face of substantially the diameter of the tube 34 so as to bear only against the corresponding central portion of the diaphragm, and said follower is retained in the cap 28 as a part of the cap assembly by an expansion ring 39 of spring wire which seats in a groove near the inner edge of the cap 28 at a place where it permits ample movement of the following to assure positive closure of the valve 33 against the outer end of the tube 33.

For holding the ring 28 in the position in which the diaphragm 33 is securely clamped in place a spring clip 40 is secured to the side of the hub 16 and has a portion 41 extending somewhat circumferentially of and toward the rear edge face of the clamping ring 28 which is radially ribbed or serrated, as indicated at 42, to afford a sort of ratchet like engagement with the spring portion 41 by which unscrewing movement of the clamping ring 28 is resisted when the ring is installed in place.

This spring clip may be secured to the body 10 in any convenient manner but it is preferred to provide the hub 16 at one side with a flat face having a recess 43 to accommodate the shank of the spring clip and in which said shank is secured by peening edge portions of the recess over the shank as indicated at 44.

Instead of incorporating the diaphragm valve structure in a combined spray nozzle and valve assembly as above described, the valve structure may be made as a separate unit, as shown in Fig. 4, and interposed in the supply line leading to a separate spray nozzle such as disclosed in my aforesaid application Serial No. 81,288.

Such separate valve unit is the same as the structure above described and composed of the same parts except that the body thereof, at the end thereof remote from the valve, has a hub for a pipe connection instead of the strainer chamber and the strainer and nozzle parts of the structure of Figs. 1 and 2.

This hub which is indicated at 45 is internally threaded for connection thereto of a pipe 46 which leads to the separate nozzle unit, which is not shown and may be like that disclosed in my application Serial No. 81,288, and the body, which is indicated at 10a, is of the same shape as the valved end portion of the structure of Figs. 1 and 2 with flared wall 13 having an externally threaded end engaged by a clamping ring 28 by which a cap 29 containing the follower 35 and spring 37, is secured onto the flared end of the body 10a with the diaphragm 33 interposed therebetween.

This separate valve unit also has the laterally extending hub 16 to which the supply pipe 17 is connected which communicates with the valve chamber 14 at one side of the partition 15 which supports the tube 34 against which the diaphragm valve 33 seats, the hub 45 being at the opposite side of said partition 15 in line with the tube 34 which leads to the interior of said hub 45.

With the above described devices, when the liquid supply through the pipe 17 is shut off the diaphragm valve 33 is closed against the end of the tube 34, as shown in Fig. 2, but when the liquid is supplied, the pressure thereof forces the diaphragm valve away from the tube 32 to the position shown in Fig. 4 in which the liquid is free to flow into the tube 34 and to the spray nozzle which, as above explained may be incorporated in a unitary assembly with the valve structure as shown in Figs. 1 and 2 or connected by a pipe 46 (see Fig. 4) with a separate spray nozzle. Whenever the liquid supply is interrupted, the valve 33 immediately closes against the end of the tube 34, thereby interrupting communication of any residue liquid in the supply lines to the nozzle and avoiding objectionable dripping from the nozzle which it is the purpose of this invention to eliminate.

The size of the tube 34 against which the valve seats being much less than that of the flared end of the body and of the diaphragm 33 which closes said flared end, the valve responds quickly to liquid supply pressure and is maintained in the open position without appreciably diminishing the pressure at the nozzle. Moreover, its functioning is unaffected by sudden and precipitate movements, such as banking of an airplane in which it is installed, and it performs its functions in a normal manner under such conditions.

While I have shown and described my invention in a preferred form, I am aware that changes can be made therein without departing from the spirit of my invention, the scope of which is to be determined by the appended claims.

What is claimed is:

1. A diaphragm valve device of the class described comprising an elongated hollow one piece body which has an opening extending therethrough from end to end, said body being formed between the ends thereof with an internal annular partition which is between the opposite end portions of said opening and divides the latter into two adjoining chambers, one of which is flared to increased size at the outer end thereof remote from said partition, said partition having a central opening extending therethrough between said chambers at the inner ends thereof, a tube which is open at both ends and secured at its inner open end in said central opening of the partition and projects therefrom centrally through the said flared chamber and has its outer open end thereof at the flared end of said flared chamber, a cap member which is detachably secured to the body at the flared end of the flared chamber and contains a spring and a plate which is pressed by the spring toward the said outer open end of the tube, and a flexible diaphragm of elastic material which is interposed between said outer end of the tube and the spring pressed plate and centrally engaged by the latter, said diaphragm being peripherally clamped by said cap member against said body around the flared end of the flared chamber, and said body having an opening through the side thereof and leading directly into the side of the flared chamber at the partition end thereof.

2. A diaphragm valve device of the class described comprising an elongated hollow one piece body which has an opening extending therethrough from end to end, said body being formed between the ends thereof with an internal annular partition which is between the opposite end portions of said opening and divides the latter into two adjoining chambers, one of which is flared to increased size at the outer end thereof remote from said partition, and the other of which has a cylindrical strainer therein and is closed at the outer end by a removable spray tip, said partition having a central opening extending therethrough between said chambers at the inner ends thereof, a tube which is open at both ends and secured at its inner open end in said central opening of the partition and projects therefrom centrally through the said flared chamber and has its outer open end thereof at the flared end of said flared chamber, a cap member which is detachably secured to the body at the flared end of the flared chamber and contains a spring and a plate which is pressed by the spring toward the said outer open end of the tube, and a flexible diaphragm of elastic material which is interposed between said outer end of the tube and the spring pressed plate and centrally engaged by the latter, said diaphragm being peripherally clamped by said cap member against said body around the flared end of the flared chamber, and said body having an opening through the side thereof and leading directly into the side of the flared chamber at the partition end thereof.

3. A diaphragm valve device of the class described comprising an elongated hollow one piece body which has an opening extending therethrough from end to end, said body being formed between the ends thereof with an internal annular partition which is between the opposite end portions of said opening and divides the latter into two adjoining chambers, one of which is flared to increased size at the outer end thereof remote from said partition, said partition having a central opening extending therethrough between said chambers at the inner ends thereof, a tube which is open at both ends and secured at its inner open end in said central opening of the partition and projects therefrom centrally through the said flared chamber and has its outer open end thereof at the flared end of said flared chamber, a cap member which is detachably secured to the body at the flared end of the flared chamber and contains a spring and a plate which is pressed by the spring toward the said outer open end of the tube, and a flexible diaphragm of elastic material which is interposed between said outer end of the tube and the spring pressed plate and centrally engaged by the latter, said diaphragm being peripherally clamped by said cap member against said body around the flared end of the flared chamber, and said body having an opening through the side thereof and leading directly into the side of the flared chamber at the partition end thereof, said cap member, spring and plate being combined in a unit assembly with the spring retained in the cap member by the plate and the plate peripherally engaged with and slidable along the surrounding wall of the cap member in a direction to and from said outer end of the tube, said surrounding wall having removable stop means thereon against which the periphery of the plate is engageable and by which the plate is retained in the cap and the sliding movement thereof restricted.

FRED W. WAHLIN.

References Cited in the file of this patent

UNITED STATES PATENTS

| Number | Name | Date |
| --- | --- | --- |
| 263,731 | Shaw | Sept. 5, 1882 |
| 1,410,070 | Mueller | Mar. 21, 1922 |
| 1,496,935 | Lemmon | June 10, 1924 |
| 1,865,390 | Ballard | June 28, 1932 |
| 1,871,535 | Lattner | Aug. 16, 1932 |
| 2,164,411 | Kennedy | July 4, 1939 |
| 2,283,513 | Smith | May 19, 1942 |
| 2,382,124 | Bahnson | Aug. 14, 1945 |